(12) United States Patent
Sampathkumar

(10) Patent No.: US 9,037,538 B2
(45) Date of Patent: May 19, 2015

(54) FILE SYSTEM MIGRATION

(75) Inventor: Kishore Kaniyar Sampathkumar, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 86 days.

(21) Appl. No.: 13/642,062

(22) PCT Filed: May 13, 2010

(86) PCT No.: PCT/US2010/034794
§ 371 (c)(1),
(2), (4) Date: Oct. 18, 2012

(87) PCT Pub. No.: WO2011/142762
PCT Pub. Date: Nov. 17, 2011

(65) Prior Publication Data
US 2013/0054520 A1      Feb. 28, 2013

(51) Int. Cl.
*G06F 17/30* (2006.01)
*G06F 3/06* (2006.01)

(52) U.S. Cl.
CPC .............. *G06F 3/0617* (2013.01); *G06F 3/064* (2013.01); *G06F 3/0647* (2013.01); *G06F 3/067* (2013.01); *G06F 17/30079* (2013.01)

(58) Field of Classification Search
CPC .................... G06F 17/30079; G06F 17/30067; G06F 3/0647; G06F 3/064; G06F 3/067
USPC .................. 707/610, 609, 822, E17.01, 999.2
See application file for complete search history.

(56) References Cited

U.S. PATENT DOCUMENTS

| | | | |
|---|---|---|---|
| 6,108,748 A | 8/2000 | Ofek et al. | |
| 6,418,449 B1 * | 7/2002 | Chen et al. | 1/1 |
| 6,574,591 B1 * | 6/2003 | Kleiman et al. | 1/1 |
| 6,938,039 B1 * | 8/2005 | Bober et al. | 707/704 |
| 6,961,812 B2 * | 11/2005 | Bjork et al. | 711/112 |
| 7,024,586 B2 * | 4/2006 | Kleiman et al. | 714/6.32 |
| 7,155,594 B2 * | 12/2006 | Murakami | 711/170 |
| 7,240,122 B2 * | 7/2007 | Sato | 709/232 |
| 7,281,104 B1 * | 10/2007 | Tsypliaev et al. | 711/165 |
| 7,293,154 B1 * | 11/2007 | Karr et al. | 711/202 |
| 7,395,283 B1 * | 7/2008 | Atzmony et al. | 1/1 |
| 7,398,285 B2 * | 7/2008 | Kisley | 1/1 |
| 7,434,022 B1 * | 10/2008 | Scharland et al. | 711/173 |

(Continued)

FOREIGN PATENT DOCUMENTS

CN          101097556 A        1/2008

OTHER PUBLICATIONS

Luo et al., "Live and Incremental Whole-System Migration of Virtual Machines Using Block-Bitmap", In the 2008 International Conference on Cluster Computing, Oct. 2008, pp. 99-106.*

*Primary Examiner* — Phuong Thao Cao
(74) *Attorney, Agent, or Firm* — Brooks, Cameron & Huebsch, PLLC

(57) ABSTRACT

A method to perform file system migration is described. The method comprises associating a source block device to a destination block device, wherein the source block device and the destination block device include a plurality of source blocks and destination blocks, respectively. At least one command for a source block from the plurality of source blocks is directed to the source block device or the destination block device based at least on the associating. Further, a destination block from the plurality of destination blocks is updated based, in part, on the at least one directed command.

14 Claims, 6 Drawing Sheets

(56) References Cited

U.S. PATENT DOCUMENTS

| | | | |
|---|---|---|---|
| 7,441,096 B2* | 10/2008 | Kitamura | 711/203 |
| 7,475,199 B1* | 1/2009 | Bobbitt et al. | 711/154 |
| 7,546,432 B2* | 6/2009 | Stacey et al. | 711/165 |
| 7,590,671 B2* | 9/2009 | Achiwa | 707/822 |
| 7,613,889 B2* | 11/2009 | Stakutis et al. | 711/162 |
| 7,640,409 B1* | 12/2009 | Stafford et al. | 711/162 |
| 7,752,491 B1* | 7/2010 | Liikanen et al. | 714/6.13 |
| 7,822,933 B1* | 10/2010 | Sontakke et al. | 711/162 |
| 7,900,005 B2* | 3/2011 | Kotsovinos et al. | 711/162 |
| 7,984,016 B2* | 7/2011 | Kisley | 707/613 |
| 8,055,864 B2* | 11/2011 | Sawdon et al. | 711/162 |
| 8,122,213 B2* | 2/2012 | Cherian et al. | 711/162 |
| 8,195,600 B2* | 6/2012 | Clifton et al. | 707/E17.005 |
| 8,219,768 B2* | 7/2012 | Nishibori et al. | 711/162 |
| 8,285,681 B2* | 10/2012 | Prahlad et al. | 707/640 |
| 8,285,758 B1* | 10/2012 | Bono et al. | 707/822 |
| 8,315,973 B1* | 11/2012 | Kaiser et al. | 707/609 |
| 8,429,360 B1* | 4/2013 | Iyer et al. | 711/162 |
| 8,438,138 B2* | 5/2013 | Rathi et al. | 707/665 |
| 8,478,725 B2* | 7/2013 | Mashtizadeh et al. | 707/640 |
| 8,683,152 B2* | 3/2014 | Kulkarni et al. | 711/162 |
| 8,825,591 B1* | 9/2014 | Lai et al. | 707/602 |
| 2003/0028737 A1* | 2/2003 | Kaiya et al. | 711/162 |
| 2003/0188097 A1 | 10/2003 | Holland et al. | |
| 2003/0237019 A1* | 12/2003 | Kleiman et al. | 714/6 |
| 2004/0059882 A1* | 3/2004 | Kedem et al. | 711/162 |
| 2004/0260735 A1* | 12/2004 | Martinez et al. | 707/204 |
| 2004/0260970 A1* | 12/2004 | Beardsley et al. | 714/6 |
| 2004/0267706 A1* | 12/2004 | Springer et al. | 707/3 |
| 2005/0027748 A1* | 2/2005 | Kisley | 707/200 |
| 2005/0055402 A1* | 3/2005 | Sato | 709/205 |
| 2005/0138089 A1* | 6/2005 | Kasai | 707/204 |
| 2005/0193180 A1* | 9/2005 | Fujibayashi | 711/162 |
| 2005/0278492 A1* | 12/2005 | Stakutis et al. | 711/161 |
| 2006/0010169 A1* | 1/2006 | Kitamura | 707/200 |
| 2006/0015946 A1* | 1/2006 | Yagawa | 726/32 |
| 2006/0047923 A1* | 3/2006 | Kodama | 711/161 |
| 2006/0129654 A1* | 6/2006 | Sato | 709/213 |
| 2006/0155944 A1* | 7/2006 | Kano | 711/161 |
| 2006/0212481 A1* | 9/2006 | Stacey et al. | 707/104.1 |
| 2006/0212746 A1* | 9/2006 | Amegadzie et al. | 714/6 |
| 2006/0221721 A1* | 10/2006 | Tanaka et al. | 365/189.05 |
| 2006/0224843 A1* | 10/2006 | Rao et al. | 711/161 |
| 2007/0055715 A1* | 3/2007 | Achiwa | 707/204 |
| 2007/0083482 A1* | 4/2007 | Rathi et al. | 707/1 |
| 2007/0136548 A1* | 6/2007 | Mane | 711/170 |
| 2007/0146788 A1* | 6/2007 | Shinozaki et al. | 358/1.16 |
| 2007/0156791 A1* | 7/2007 | Everhart | 707/204 |
| 2007/0204119 A1* | 8/2007 | Murotani et al. | 711/161 |
| 2007/0266056 A1* | 11/2007 | Stacey et al. | 707/203 |
| 2007/0271413 A1* | 11/2007 | Fujibayashi et al. | 711/112 |
| 2008/0072003 A1* | 3/2008 | Vu et al. | 711/162 |
| 2008/0154840 A1 | 6/2008 | Rathi et al. | |
| 2008/0209145 A1* | 8/2008 | Ranganathan et al. | 711/162 |
| 2008/0222375 A1* | 9/2008 | Kotsovinos et al. | 711/162 |
| 2008/0320062 A1* | 12/2008 | Miyamae et al. | 707/205 |
| 2009/0043829 A1* | 2/2009 | Mizuno | 707/204 |
| 2009/0043978 A1* | 2/2009 | Sawdon et al. | 711/162 |
| 2009/0228532 A1* | 9/2009 | Anzai | 707/204 |
| 2009/0228535 A1* | 9/2009 | Rathi et al. | 707/204 |
| 2009/0254722 A1* | 10/2009 | Kobashi | 711/162 |
| 2009/0319586 A1* | 12/2009 | Clifton et al. | 707/205 |
| 2010/0070466 A1* | 3/2010 | Prahlad et al. | 707/609 |
| 2010/0070474 A1* | 3/2010 | Lad | 707/624 |
| 2010/0076934 A1* | 3/2010 | Pershin et al. | 707/640 |
| 2010/0077169 A1 | 3/2010 | Pace | |
| 2010/0082920 A1* | 4/2010 | Larson | 711/162 |
| 2010/0131728 A1* | 5/2010 | Miyamae et al. | 711/162 |
| 2010/0185587 A1* | 7/2010 | Lovinger | 707/660 |
| 2010/0257328 A1* | 10/2010 | Liu | 711/162 |
| 2010/0287345 A1* | 11/2010 | Cherian et al. | 711/162 |
| 2011/0066597 A1* | 3/2011 | Mashtizadeh et al. | 707/640 |
| 2011/0153697 A1* | 6/2011 | Nickolov et al. | 707/827 |
| 2012/0303913 A1* | 11/2012 | Kathmann et al. | 711/162 |
| 2014/0195490 A1* | 7/2014 | Leverett et al. | 707/639 |

* cited by examiner

| 0 | 1 | 0 | 1 | 1 | 1 | 0 | 0 | 1 | 1 |
|---|---|---|---|---|---|---|---|---|---|
| 1 | 0 | 1 | 1 | 1 | 0 | 0 | 0 | 1 | 0 |
|  |  |  |  |  |  |  |  |  |  |
|  |  |  |  |  |  |  |  |  |  |
| 0 | 0 | 1 | 1 | 1 | 1 | 0 | 0 | 1 | 1 |

| 0 | 0 | 1 | 0 | 0 | 0 | 1 | 1 | 1 | 1 |
|---|---|---|---|---|---|---|---|---|---|
| 1 | 0 | 0 | 0 | 0 | 0 | 1 | 1 | 1 | 0 |
|  |  |  |  |  |  |  |  |  |  |
|  |  |  |  |  |  |  |  |  |  |
| 0 | 0 | 1 | 1 | 1 | 1 | 0 | 0 | 0 | 0 |

| 1 | 1 | 1 | 0 | 1 | 0 | 0 | 1 | 0 | 1 |
|---|---|---|---|---|---|---|---|---|---|
| 1 | 1 | 0 | 0 | 0 | 1 | 0 | 1 | 0 | 0 |
|  |  |  |  |  |  |  |  |  |  |
|  |  |  |  |  |  |  |  |  |  |
| 0 | 0 | 1 | 0 | 0 | 0 | 0 | 1 | 1 | 0 |

Fig. 4

FILE SYSTEM MIGRATION

BACKGROUND

Generally, migration of a file system involves copying the file system located on a source block device, such as a disk partition, of a source device to a destination block device of a destination device and reproduce the file system. The block devices may also include, for example, a logical disk or a logical volume.

During file system migration, the file system may be modified at the destination block device. Modifications to the file system may be made for various purposes, for example, to ensure storage consolidation, to make space available for future storage, and to achieve effective disk space utilization. There may be certain modifications, such as downsizing of the file system, which may not be achievable at the destination block device. Such modifications of the file system may be carried out at an intermediate storage device between the source block device and the destination block device, or at the source block device.

Generally, there is no intermediate storage device available during file system migration, even on a temporary basis. In addition, the source block device may be placed in a quiesced state, i.e., a state where access to the file system on the source block device is available for read-only purposes and no modification to the file system can be made on the source block device. The source block device is placed in such a state to maintain consistency and integrity of the file system at the destination block device with reference to the source block device.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 4 illustrates an exemplary allocation bitmap, according to an implementation of the present invention.

DETAILED DESCRIPTION

Figure 1:
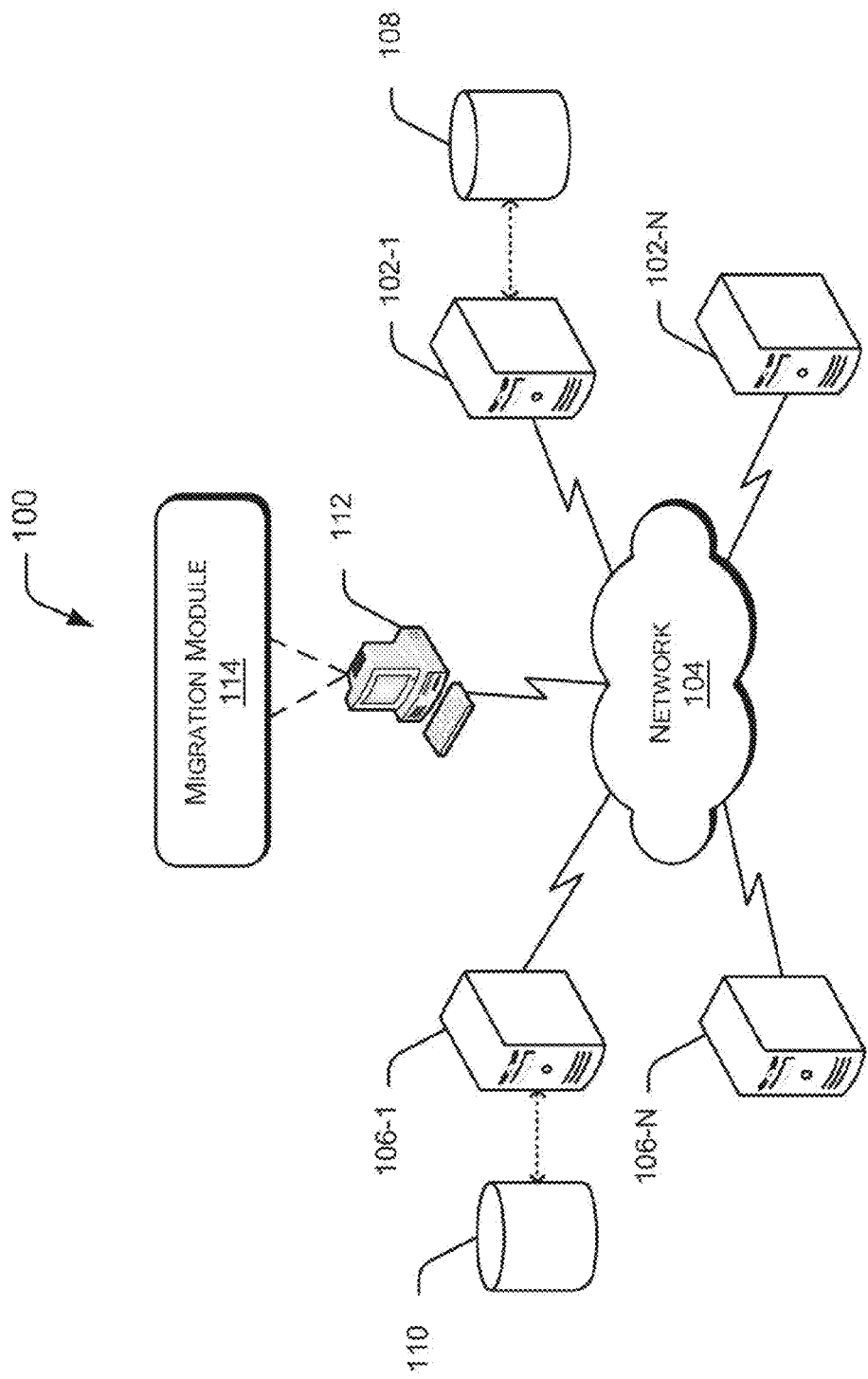
FIG. 1 illustrates an exemplary network environment having one or more devices for performing file system migration, according to an implementation of the present invention.

Methods and devices for performing file system migration are described herein. A file system can be migrated from a source block device at a source device to a destination block device at a destination device. The file system on a block device can be in the form of discrete data blocks referred to as file system blocks. The file system, during migration, involves transfer of the file system blocks from the source block device to the destination block device.

The process of file system migration from the source block device to the destination block device may include modification of the file system, for example, resizing the file system. File system resizing involves adjusting a disk space that the file system utilizes on a block device. During such a modification, the file system may be upsized or downsized depending on the disk space available on the destination block device.

Certain modifications of the file system, such as upsizing of the file system, are generally achieved as a post-migration step at the destination block device. In such cases, after migration of the file system onto the destination block device, a file system tool can be run to expand the file system to a new size of the destination block device. This tool ensures that the file system is upsized to expand and occupy the additional space on the destination block device.

Modifications, such as downsizing of the file system, can be achieved in two ways, namely, file system modification with non-relocation and file system modification with relocation. As is known in the art, relocation involves moving the data blocks in a file system, say, to create a contiguous free space on the block device.

In the file system modification with non-relocation, the file system blocks are not relocated at the destination block device. In addition, the data in the file system blocks of the file system are left untouched during downsizing the file system. Any contiguous free space between a last file system block in the file system having valid data and an end of the file system determines the extent of downsizing of the file system that can be achieved. Further, in the present case, defragmentation of the file system is not achieved and the extent of downsizing is also limited.

On the other hand, in file system modification with relocation, the file system blocks are relocated on the given block device. During relocation of data, the meta-data and the corresponding data in the file system blocks are moved around to combine free space, which is scattered in portions on the block device. The data in the file system blocks is made contiguous in one part of the block device and contiguous free space is made available on the block device for future storage. Further, the contiguous free space is usually made available towards an end of the storage space on block device. With such an approach, an effective downsizing of the file system can be achieved.

However, downsizing of the file system at the destination block device with relocation of the file system blocks is difficult to handle during the migration of file system blocks. The difficulty may be pronounced when space at the corresponding destination block device is less than the space acquired by the file system on the source block device. The space constraint at the destination block device may be attributed to various reasons, for example, to ensure storage consolidation, to make space available for future storage, and to achieve effective block device space utilization. In such cases, the modification of the file system may not be achievable at the destination block device.

Moreover, during file system migration, intermediate storage devices are not available to buffer data and perform any modification or changes as part of the file system migration.

To this end, systems and methods are described to perform file system migration. In one implementation, a mapping pair is created by associating a source block device and a destination block device. The association is implemented by mapping blocks on a source block device to corresponding blocks on a destination block device.

The association, in one implementation, is used to capture and redirect updates for the blocks, as part of the file system migration process, to the destination block device. For example, commands such as read or write requests are monitored. If a write request intended for one of the blocks of the source block devices is received, the write request is subsequently directed to a corresponding block on the destination block device. In response to the write request, the block on the destination block device is updated. The block on the destination block device is determined based on the association between the source block device and the destination block device, i.e., based on the mapping pair. Hence, the updates for the file system are redirected to the destination block device.

On the other hand, if a read request intended for one of the blocks of the source block devices is received, a determination is made to check if the block, which is to be read, has been updated or not. If that block on the source block device has not yet been updated, the read request is subsequently directed to the block of the source block device. If, however, the block on the source block device has been updated, that is, copied and relocated, on the destination block device, the read request is subsequently directed to the updated block on the destination block device. Hence, read requests for blocks on the source block device, which have been updated at the destination block device, are redirected to the corresponding blocks on the destination block device.

In one implementation, the updates to the blocks on the destination block device can be tracked using a the system update bitmap. In an implementation, the file system update bitmap can be represented by an array, in which each bit may correspond to a block on the destination block device. For example, a bit in the file system update bitmap when set (i.e., 1) would indicate that the corresponding block on the destination block device has been updated. Conversely, a clear value of a certain bit (i.e., when 0) would indicate that the corresponding block has not been updated.

As mentioned previously, the updates and modifications, which form a part of the file system migration, are directed to the destination block device. In such a case, all but the non-updated blocks, which have data and are hence allocated, exist at the destination block device. Therefore, for completing the migration process, those blocks that have valid data but which have not been updated, are transferred from the source block device to the destination block device.

To this end, the update status of a block on the destination block device is determined based on the file system update bitmap. In an implementation, the blocks are copied from the source block device based on a copy bitmap. Further, the copy bitmap may be computed for the blocks at the source block device that are allocated, but have not been updated (i.e., the blocks for which the corresponding blocks of the file system update bitmap is clear). In one implementation, the copy bitmap is based on the file system update bitmap and a destination allocation bitmap. In said implementation, the copy bitmap is computed for those blocks that correspond to the clear bits in the file system update bitmap.

It may be understood that the file system migration may be achieved in a similar manner as described above when the blocks of the file system are segregated into a number of block groups. In such a case, an update status of a block group is determined based on an update status field in the file system update bitmap. If the update status for the block group is clear, it indicates that none of the blocks of the block group were updated. In such a case, the blocks are copied from the source block device based on a source avocation bitmap of the block group.

On the other hand, the update status for the block group when set indicates that at least one of the blocks in the block group was updated. The blocks that are not updated but are allocated in the source block group on the source block device are to be copied now. To identify such blocks, a copy bitmap is computed for that block group. In an implementation, the copy bitmap is based on a block group update bitmap and a destination block group bitmap.

The methods and devices described herein perform file system migration with dynamic relocation of the file system blocks on the destination block device without affecting the file system on the source block device. Further, such a file system migration achieves effective consolidation of data, creates space for future storage, and achieves efficient utilization of free space.

The manner, in which a file system migration is performed, shall be explained in detail with respect to FIG. 1 through FIG. 6. While aspects of systems and methods can be implemented in any number of different computing systems, environments, and/or configurations, the embodiments are described in the context of the following exemplary system architecture(s).

FIG. 1 illustrates an exemplary network environment 100 for performing file system migration, according to an implementation of the present invention. The network environment 100 may include one or more source devices 102-1, 102-2 . . . 102-N (collectively referred to as source devices 102). The source devices 102 are connected to a network 104. The network environment 100 may further include one or more destination devices 106-1, 106-2 . . . 106-N (collectively referred to as destination devices 106).

The source devices 102 and the destination devices 106 can be a variety of devices, such as servers, mainframe computers, personal computers, laptops, personal digital assistants (PDAs), etc. For example, in one implementation, the network environment 100 can be a company network, including thousands of office personal computers, laptops, various servers, such as blade servers, and other computing devices connected over the network 104. In another implementation, the network environment 100 can be a home network with a limited number of personal computers and laptops connected over the network 104.

The destination devices 106 may communicate with the source devices 102 over the network 104. The network 104 may be a wireless network, wired network, or a combination thereof. The network 104 can be implemented as one of the different types of networks, such as intranet, local area network (LAN), wide area network (WAN), the Internet, and such. The network 104 may either be a dedicated network, or a shared network, which represents an association of the different types of networks that use a variety of protocols, for example, Hypertext Transport Protocol (HTTP), Transport Control Protocol/Internet Protocol (TCP/IP), Wireless Application Protocol (WAP), etc., to communicate with each other.

Further, each of the source devices 102 is associated with a source block device 108. The source block device 108 may have a corresponding allocation bitmap, hereinafter referred to as source allocation bitmap, associated with it. The source allocation bitmap may indicate an allocation status of the blocks on the source block device 108.

Furthermore, each of the destination devices 106 may be associated with a destination block device 110. The destination block device 110 may have a corresponding allocation bitmap, referred to as destination allocation bitmap, associated with it. The destination allocation bitmap may indicate an allocation status of the blocks on the destination block device 110.

The source block device 108 and the destination block device 110 can be, for example, a physical disk partition or a logical disk partition, such as a logical volume. In one implementation, the block devices 108, 110 can be internal to the source devices 102 and the destination devices 106, respectively. In another implementation, the source block device 108 and the destination block device 110 may be two separate logical partitions of the same physical block device, which resides in the any one of the devices shown in the network environment 100.

In an implementation, the source block device 108 stores a file system to be migrated to the destination block device 110. The file system may be stored on the source block device 108 in the form of a plurality of data blocks. Further, the plurality of blocks may be clustered together to form one or more block groups. Furthermore, the destination block device 110 may have similar storage configuration as the source block device 108.

According to an implementation, the network environment 100 also includes one or more computing devices 112, for example, an administrator computing device, to perform file system migration. It may be understood that although the computing device 112 is depicted as having a different configuration from the source devices 102 and the destination devices 106, it may have a configuration that is same or similar to one of the source devices 102 or the destination devices 106. The computing device 112 may be implemented as a server, mainframe computer, personal computer, laptop, personal digital assistant (PDA), etc.

In one implementation, the computing device 112 includes a migration module 114. During file system migration, the file system located on the source block device 108 may be copied to an identified destination block device 110 by the migration module 114. It may be understood that although the migration module 114 is illustrated as residing on the computing device 112, the migration module 114 can reside on either the source device 102 or the destination device 106.

In one implementation, the file system migration is performed by associating the source block device 108 and the destination block device 110, thereby creating a mapping pair. The migration module 114 issues commands, for example, read or write requests, as part of the file system migration process. Through the association between the source block device 108 and the destination block device 110, the commands issued by the migration module 114 are captured and monitored.

Further, the commands are subsequently directed to the relevant block device based on the monitoring. For example, a write request intended for one of the blocks on the source block device 108 is redirected to the corresponding block on the destination block device 110 and the block on the destination block device 110 is updated. The updating of blocks on the destination block device 110 includes, for example, copying of blocks from the source block device 108 and relocating the copied blocks onto the destination block device 110. Further, such updating of the blocks on the destination block device 110 is performed as part of file system migration. In one implementation, the corresponding block on the destination block device 110 is determined based on the association of the source block device 108 and the destination block device 110.

Similarly, when a read request intended for one of the blocks of the source block device 108 is received, a determination is made at the computing device 112. The determination ascertains whether the block, which is to be read, has been updated on the destination block device 110 or not. If the block has not yet been updated, the read request is directed to the block on the source block device 108. If however, the block on the source block device 108, has been updated, the read request is redirected to the updated block on the destination device 106.

As described above, read requests for an updated block on the source block device 108 are subsequently directed to an associated block on the destination block device 110. For handling the commands generated by the migration module 114, in one implementation, updates to the blocks on the destination block device 110 can be tracked using a file system update bitmap. In one implementation, a bit in the file system update bitmap may correspond to a block on the destination block device 110. For example, a block of the file system update bitmap when set (i.e., 1) would indicate that the corresponding block on the destination block device 110 has been updated. Conversely, a clear value for a certain block (i.e., 0) would indicate that the corresponding block has not been updated.

In order to complete the migration of the file system, the migration module 114 then proceeds to identify those blocks on the source block device 108 having valid data but are not updated, based on the file system update bitmap. In an implementation, the blocks remaining to be copied may be identified from the source block device 108 based on an update status of the file system update bitmap.

In another implementation, the blocks of the source block device 108 and the destination block device 110 are structured as block groups. In such a case, the file system update bitmap can include an update status field. The update status field when set indicates that at least one block within a block group has been updated on the destination block device 110. For example, one out of a hundred blocks within a block group when updated would set the update status field for the block group. Similarly, the update status field for the block group when clear indicates that none of the blocks within the block group have been updated. The file system update bitmap may also include a block group update bitmap, which corresponds to a block group on the destination block device 110. In one implementation, the block group update bitmap indicates an update status of the various blocks in the block group on the destination block device 110.

Figure 2:
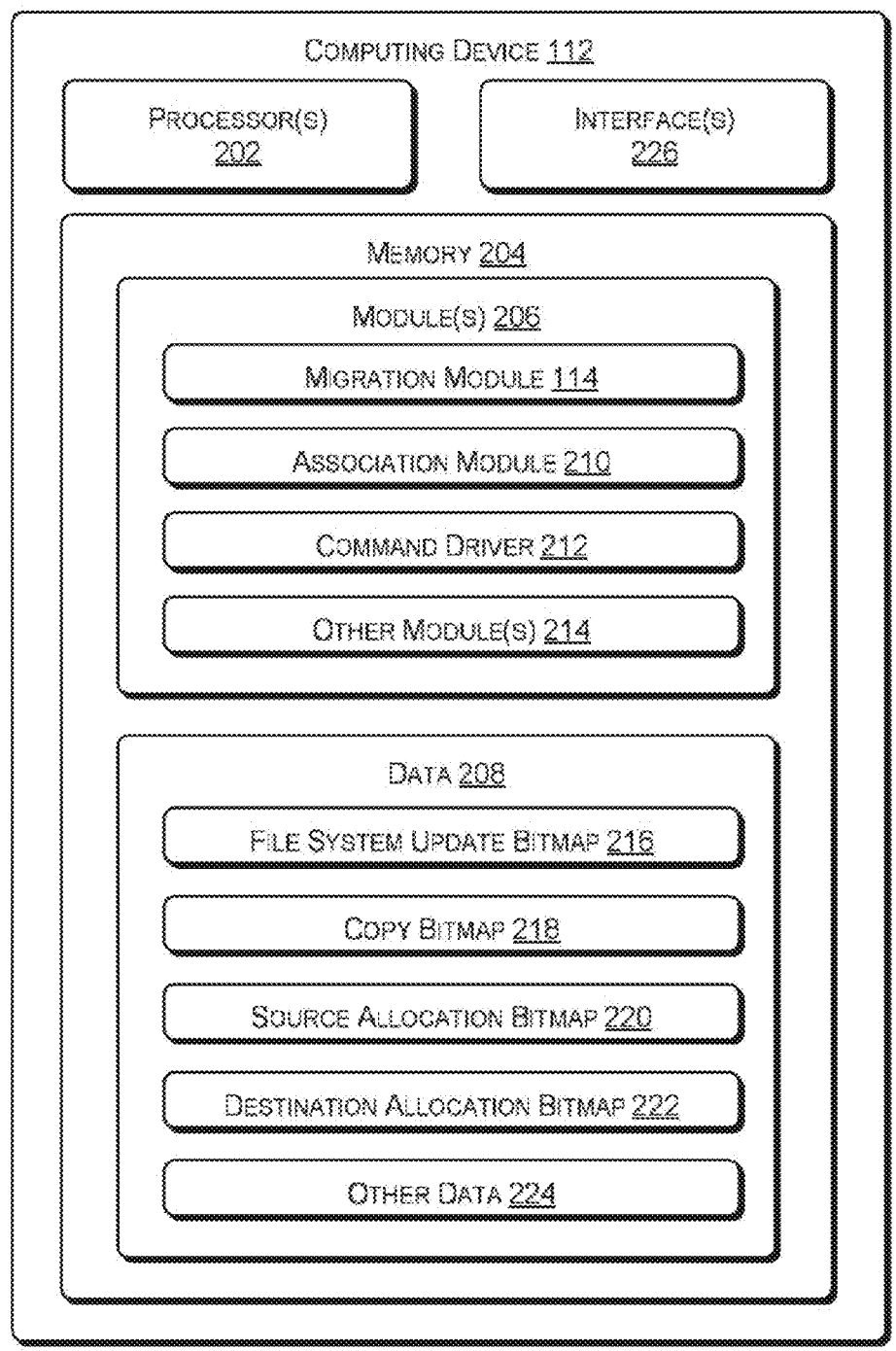
FIG. 2 illustrates an exemplary device for performing file system migration, according to an implementation of the present invention.

The manner in which file system migration is implemented is further explained in detail in conjunction with FIG. 2. FIG. 2 illustrates exemplary components of the computing device 112 for performing file system migration, as per one implementation of the present subject matter.

In one implementation, the computing device 112 includes processor(s) 202 coupled to a memory 204. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions stored in the memory 204.

The memory 204 may include a computer-readable medium known in the art including, for example, volatile memory, such as static random access memory (SRAM), dynamic random access memory (DRAM), etc., and/or non volatile memory, such as erasable program read only memory (EPROM), flash memory, etc. In one implementation, the memory 204 includes module(s) 206, and data 208.

The module(s) 206 include the migration module 114, an association module 210, a command driver 212, and other module(s) 214. The other module(s) 214 may include programs or coded instructions that supplement applications or functions performed by the computing device 112.

The data 208 includes a file system update bitmap 216, a copy bitmap 218 for each of the block group of the file system, a source allocation bitmap 220, a destination allocation bitmap 222, and other data 224. The other data 224 can also include data that is either used by, or generated as a result of the execution of one or more modules in the module(s) 206.

The data within the source block device 108 and the destination block device 110 can be represented by the source allocation bitmap 220 and the destination allocation bitmap 222, respectively. Both the allocation bitmaps 220 and 222 indicate an allocation status of the blocks of the source block device 108 and the destination block device 110, respectively.

The computing device 112 may further include interface(s) 226, for example, to facilitate communication with the source block device 108 and the destination block device 110. The interface(s) 226 may include a variety of software and hardware interfaces, for example, interfaces for peripheral device(s), such as a keyboard, a mouse, an external memory, and a printer. Further, the interface(s) 226 may enable the computing device 112 to communicate with other computing devices, such as source devices 102, destination devices 106, and external databases. The interface(s) 226 can also facilitate multiple communications within a wide variety of networks and protocol types, including wired networks, for example LAN, cable, etc., and wireless networks such as FLAN, cellular, or satellite. For the purpose, the interface(s) 226 may include one or more ports for connecting a number of computing devices to each other or to other server computers.

In operation, the computing device 112 performs file system migration from the source block device 108 to the destination block device 110. In an implementation, the file system migration includes relocation of blocks onto the destination block device 110 as a part of dynamic modification of the file system during file system migration.

To this end, the association module 210 associates or maps the source block device 108 to the destination block device 110 to create a mapping pair. In one implementation, the mapping pair can include information describing the mapping of the source block device 108 and the destination block device 110. This information can be stored in the other data 224. In one implementation, the mapping information describes the mapping between the blocks and/or block groups of the source block device 108 and the corresponding blocks and/or block groups of the destination block device 110.

In one implementation, the association module 210 creates a file system update bitmap 216 when the mapping pair is created. The file system update bitmap 216 tracks the update status of the various blocks in the destination block device 110. For example, a bit in the file system update bitmap 216 corresponds to a block on the destination block device 110. Further, as mentioned earlier, in case the blocks are arranged in a block group, the file system update bitmap 216 may also include information regarding the update status of various block groups in the file system on the destination block device 110. For example, an update status field in the file system update bitmap 216 may track the update status of the block groups in the destination block device 110. Similarly, one or more block group update bitmaps may track the update status of the blocks in the corresponding block groups. The file system update bitmap 216 has been illustrated as being on the computing device 112 in FIG. 2. However, the file system update bitmap 216 may also be present in the source device 102, without deviating from the scope of the present subject matter. In such a case, the migration module 114 imports the file system update bitmap 216 from the source device 102 to the computing device 112 or access the file system update bitmap 216 on the source device 102 through the interface(s) 226.

During the file system migration process, the migration module 114 can issue one or more commands to a block, for example, to a block having data. The commands may be a write request or a read request. For example, the migration module 114 may issue a write request to a block on the source block device 108 to update the block. Once a command is generated, it is received by the command driver 212. The command driver 212 may be implemented, for example, using user space to kernel space interactions in an operating system environment.

The command driver 212 receives the command issued by the migration module 114 and checks whether the command is a read request or a write request. In case the command is a write request, the command driver 212 redirects it to the blocks in the destination block device 110. At the destination block device 110, the write command is executed and a block on the destination block device 110 corresponding to the block on the source block device 108 is updated. In one implementation, the command driver 212 identifies the block for redirecting the write request based on the mapping information stored in the other data 224.

Once the block at the destination block device 110 is updated, the corresponding bit in the file system update bitmap 216 is also set, thereby indicating an update. In one implementation, the file system update bitmap 216 is set by the migration module 114. Further, the updated block may now be indicated as allocated in the destination avocation bitmap 222. In an implementation, the migration module 114 sets a bit in the destination allocation bitmap 222 to indicate in the destination allocation bitmap 222 that the updated blocks on the destination block device 110 are allocated and have data.

In one implementation, the migration module 114 may import the destination allocation bitmap 222 residing on the destination block device 110 onto the memory 204 and modify the destination allocation bitmap 222. In another implementation, the migration module 114 may access and modify the destination allocation bitmap 222 on the destination block device 110, for example, through interface(s) 226 provided in the computing device 112.

Returning to the requests generated by the migration module 114, it may also be the case that the command driver 212 may receive a read request from the migration module 114 to read data from the block(s) on the source block device 108. In such a case, the command driver 212 checks whether the read request is directed to a block that has already been updated on the destination block device 110 or not.

In case, the read request is directed to a block on the source block device 108 that has not been updated on the destination block device 110, then the read request is directed to the block on the source block device 108. For example, a block on the source block device 108 may not be updated on the destination block device 110 because that block may not be fragmented on the source block device 108 or, in general, may not be involved in the relocation.

In case the read request is directed to a block updated on the destination block device 110, the command driver 212 directs the read request to the corresponding block on the destination block device 110. In an implementation, the command driver 212 identifies whether the block at the source block device 108 has been updated at the destination block device 110 based on the file system update bitmap 216. In this case, the command driver 212 may direct the read request to the corresponding block on the destination block device 110 based on the association of the source block device 108 and the destination block device 110.

In one implementation, the destination allocation bitmap 222 may also indicate the blocks on the source block device 108 that have valid data but are not updated. For example, the bits for such blocks on the source block device 108 are set in the destination allocation bitmap 222 based on the source allocation bitmap 220 by the migration module 114. Further, such modification of the destination allocation bitmap 222 may occur after the blocks on the destination block device 110 have been updated and migrated.

Once the commands have been handled and the blocks updated on the destination block device 110, the migration module 114 copies those blocks from the source block device 108 that are not updated at the destination block device 110 but have valid data. To this end, the migration module 114 determines an update status of all such blocks on the destination block device 110. For example, the migration module 114 determines the update status of the blocks based on the file system update bitmap 216. Based on the update status of the blocks, the migration module 114 copies the corresponding blocks from the source block device 108 to the destination block device 110. For example, the migration module 114 identifies such blocks amongst those blocks for which the corresponding bits in the file system update bitmap 216 is clear, thus indicating that these blocks are not updated.

In one implementation, the migration module 114 copies the blocks that are not updated but have valid data, based on the copy bitmap 218. The copy bitmap 218 may be computed based on the file system update bitmap 216 and the destination allocation bitmap 222. In one implementation, the migration module 114 may compute the copy bitmap 218 by computing a XOR of the file system update bitmap 216 and the destination allocation bitmap 222. Once the copy bitmap 218 is computed, the migration module 114 may copy the blocks corresponding to the blocks that are set in the copy bitmap 218 from the source block device 108 to the destination block device 110.

It may be understood that although the file system update bitmap 216 and the copy bitmap 218 are illustrated as residing on the computing device 112, both may reside on any of the source devices 102, the destination devices 106, the source block devices 108, or on the destination block device 110.

According to another implementation, the blocks on the source block device 108 may be grouped to form one or more block groups. In such an implementation, the migration module 114 may copy the blocks from the block groups on the source block device 108. This implementation is described in detail in conjunction with the FIG. 3 and FIG. 4.

Figure 3:
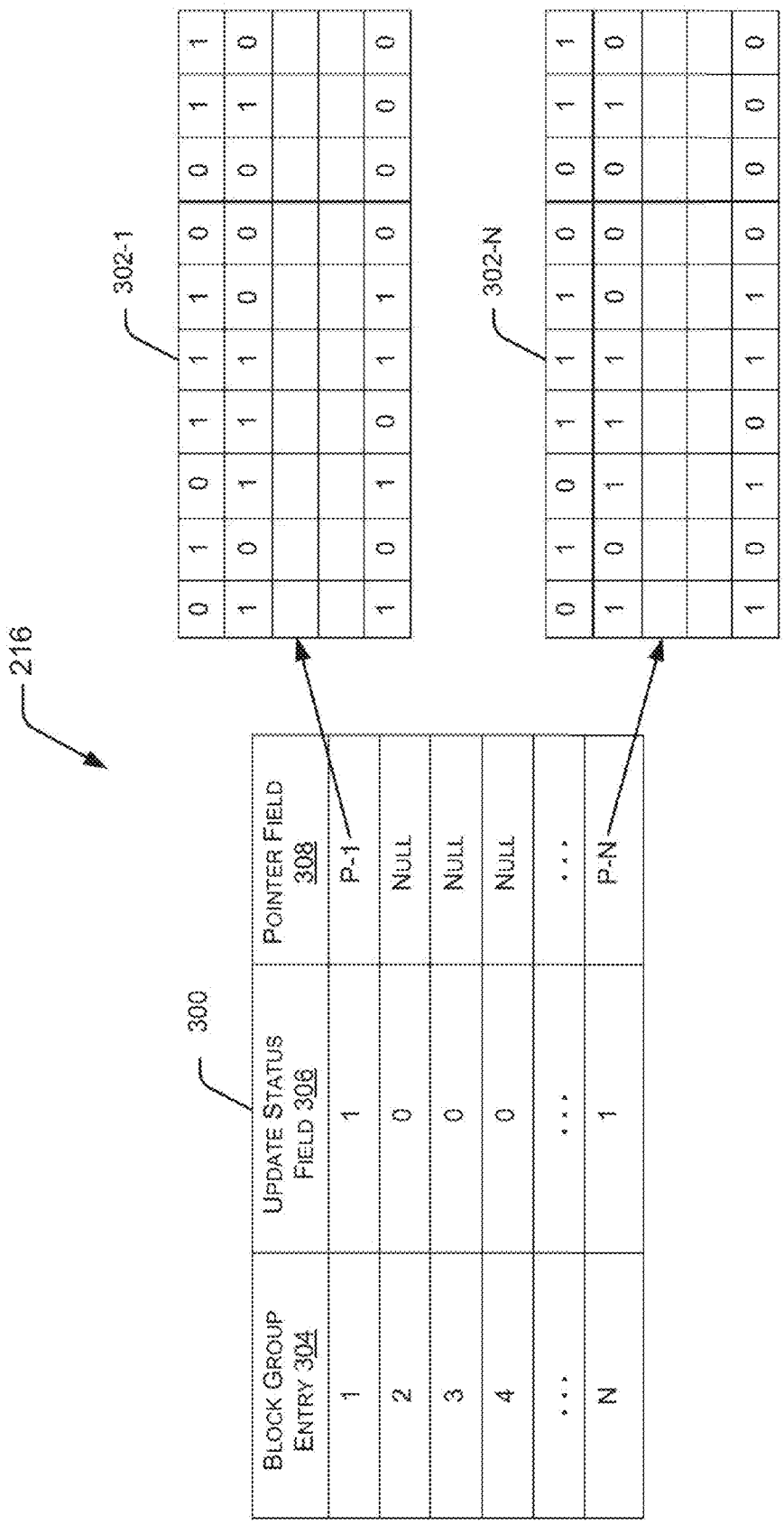
FIG. 3 illustrates an exemplary file system update bitmap, according to an implementation of the present invention.

FIG. 3 illustrates an exemplary file system update bitmap 216, which includes update bitmaps for block groups, according to an implementation of the present invention. In one implementation, the file system update bitmap 216 may track blocks and block groups that are updated at the destination block device 110.

As indicated, the file system update bitmap 216 includes an element list 300, which references one or more block group update bitmaps 302-1, 302-2 . . . 302-N (collectively referred to as block group update bitmaps 302). In one implementation, a block group update bitmap 382 may correspond to a block group on the destination block device 110. The element list 300 may include a block group entry 304, an update status field 306, and a pointer field 388. The block group entry 304 corresponds to the block group of the destination block device 110. The update status field 306 indicates the update status of the block group on the destination block device 110. The update status field 306 when set (i.e., 1) indicates that at least one block in the corresponding block group has been updated on the destination block device 110. For example, in the block group update bitmap 302-1, the bits that are set indicate that corresponding blocks in the block group on the destination block device 110 had been updated. On the other hand, a clear value (i.e., 0) in the update status field 306 may indicate that none of the blocks of the corresponding block group are updated.

Further, the pointer field 308 references one or more block group update bitmap 302. As mentioned previously, the block group update bitmap 302 can be stored in the memory 204 of the computing device 112, or in either of the source device 102, the destination device 106, the source block device 108, or the destination block device 110, and is referenced by the element list 300. Further, in another implementation, the block group update bitmap 302 may be integrated in the file system update bitmap 216. In one implementation, the block group update bitmap 302 may be dynamically created for a block group when the migration module 114 issues a first write request to update a block in the block group.

The file system update bitmap 216, as illustrated in FIG. 3, has been described with respect to block groups. The same principle will be applicable in case the source block device 108 and the destination block device 110 having individual blocks, which are not clustered into block groups. In another implementation, the file system update bitmap 216 for the file system can be illustrated by a bitmap similar to the block group bitmap 302-1, wherein each of the set bits would indicate the updated status of the corresponding block on the destination block device 110.

FIG. 4 illustrates an exemplary structure of the destination allocation bitmap 222, according to one implementation of the present invention. It may be understood that the source allocation bitmap 220 may be illustrated by a similar structure.

In said implementation, the destination allocation bitmap 222 may include one or more destination block group bitmaps 402-1, 402-2 . . . 402-N (collectively referred to as destination block group bitmap 402). In one implementation, a destination block group bitmap 402 may correspond to a block group on the destination block device 110, and each bit in the destination block group bitmap 402 may correspond to a block in that block group.

In the destination block group bitmap 402, a set bit indicates that the corresponding block in the block group has valid data and is allocated, whereas a clear bit is indicative of a free block having no valid data. A set bit for a block in the destination block group bitmap 402 may also indicate a corresponding block on the source block device 108 that has valid data but is not updated at the destination block device 110. In one implementation, the bits for the blocks that were not updated in the source block device 108 are correspondingly set in the destination block group bitmap 402, for example, by the migration module 114, based on the association of the source block device 108 and the destination block device 110.

In another implementation, the destination allocation bitmaps 222 may not be segregated into various block groups. In such a case, the destination allocation bitmap 222 may be a contiguous bitmap representing the entire file system stored on destination block device 110.

Returning to the former case, in which the blocks of the file system are arranged into block groups, the destination block group bitmap 402 is modified, for example, when the migration module 114 updates a block in the corresponding block group on the destination block device 110. In one implementation, the update of a block at the destination block device 110 may be achieved in response to a write request issued by the migration module 114. For example, with such updating, fragmented blocks from the source block device 108 can be migrated to the destination block device 110.

Following updating of the blocks, the migration module 114 identifies and copies those blocks on the source block device 108 that are not updated but have valid data. In one implementation, the migration module 114 copies such blocks based on the copy bitmap 218.

The migration module 114 generates the copy bitmap 218 based on the file system update bitmap 216. In one implementation, the migration module 114 first determines the update status of the block groups. If the update status is null, it indicates that none of the blocks within the block group, say block group corresponding to the ENTRY 2 in block group entry 304, is updated. In such a case, the migration module 114 copies all the allocated blocks within the block group, for example, indicated by the source block group bitmap 402.

If however, the update status of the block group is not null, it indicates that at least one of the block within the block group has been updated. In such a case, the migration module 114 generates a copy bitmap 218 based on the block group update bitmap 302 and the destination block group bitmap 402. The migration module 114 in such a case intends to copy those blocks that have not been updated but are allocated in the corresponding block group on the source block device 108. In one implementation, the migration module 114 generates the copy bitmap 218 by evaluating the XOR of the bits in the block group update bitmaps 302 and the bits in the destination block group bitmap 402. The copy bitmap 218 thus generated will have some blocks set and some which are clear. The migration module 114 then copies those blocks, for which the corresponding bits are set in the copy bitmap 218, from the source block device 108 to the destination block device 110. In one implementation, the copy bitmap 218 is cleared when the file system migration is complete.

Figure 5:
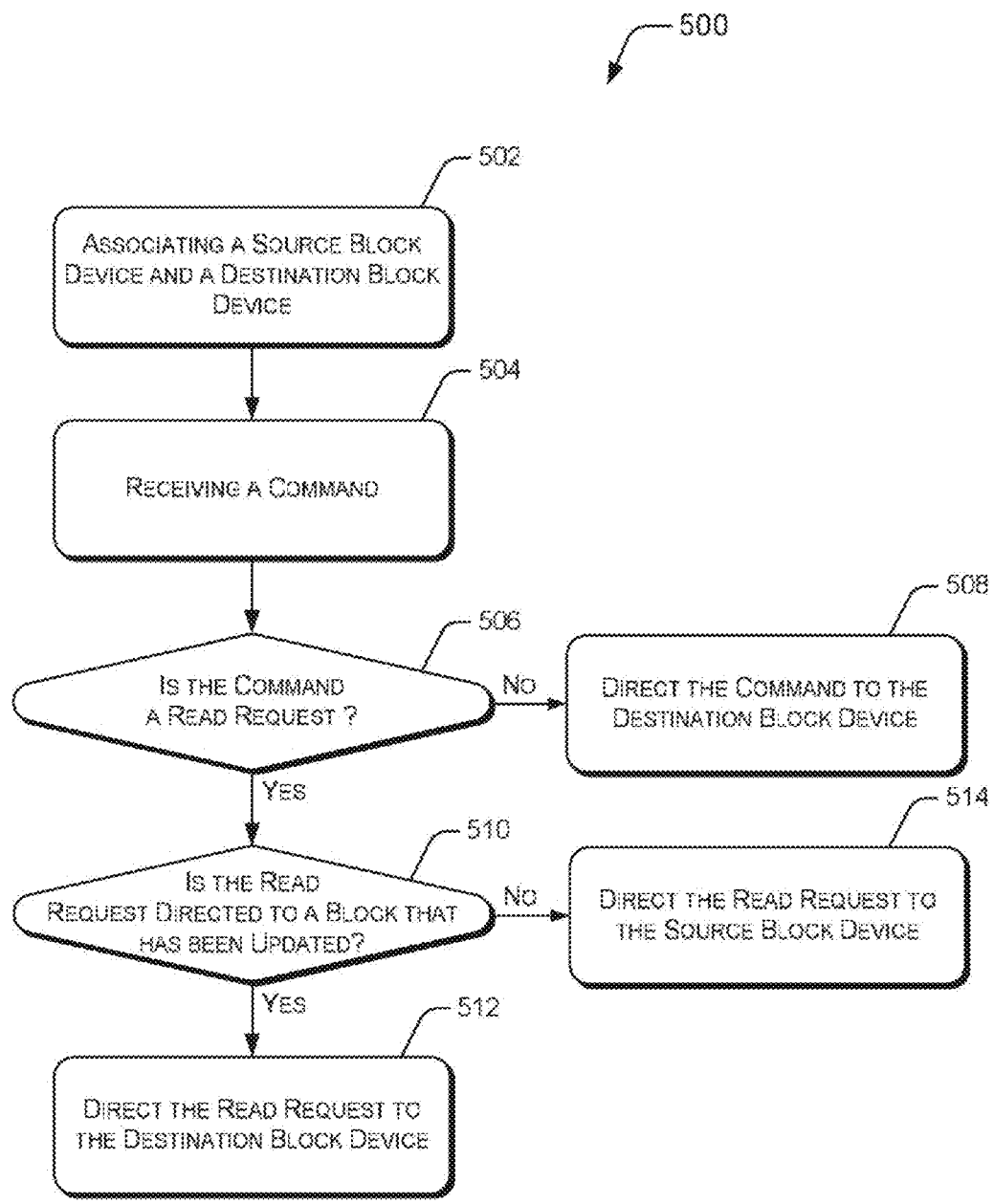
FIG. 5 illustrates an exemplary method for handling file system commands, according to an implementation of the present subject matter.
Figure 6:
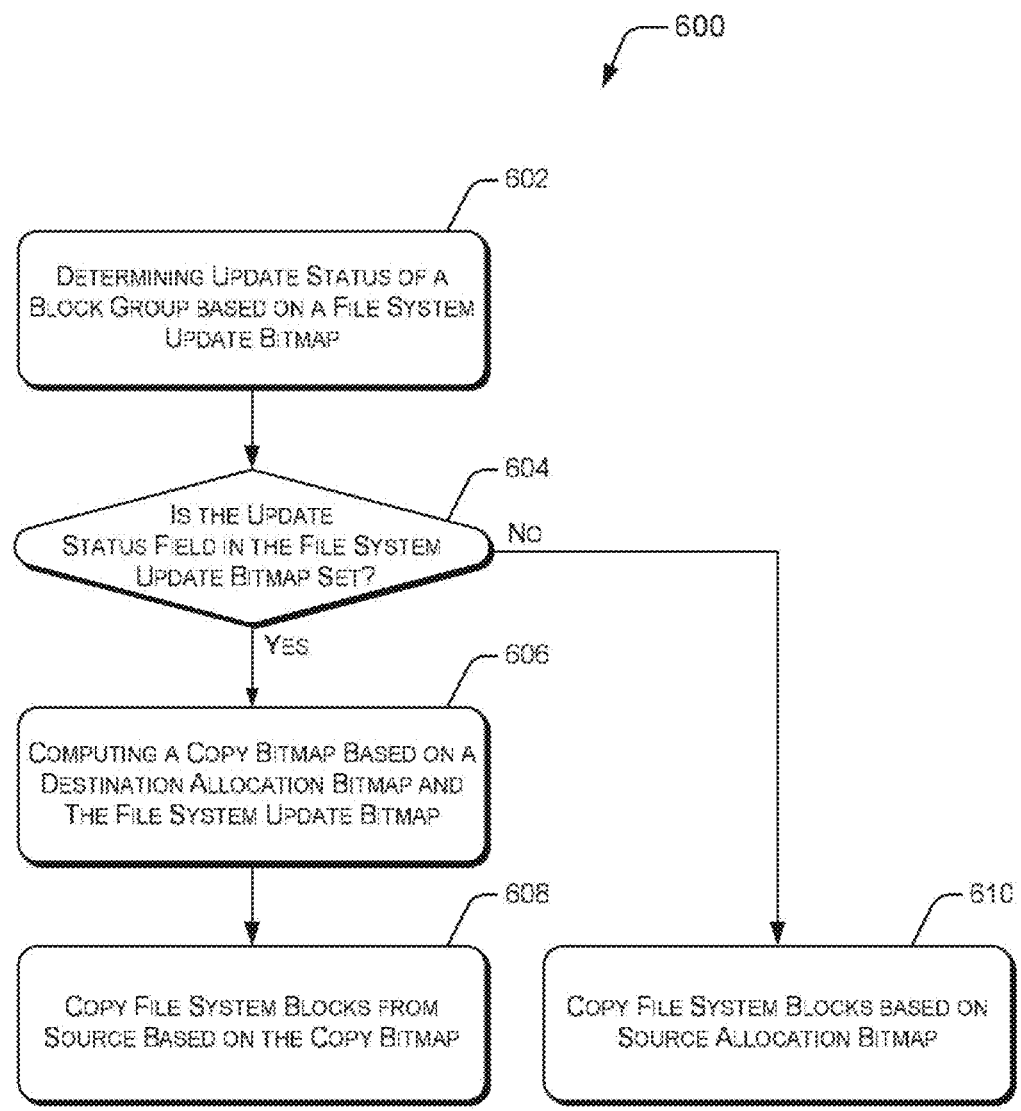
FIG. 6 illustrates an exemplary method for performing migration of file system blocks, according to an implementation of the present subject matter.

FIG. 5 and FIG. 6 illustrate an exemplary method for performing file system migration, in accordance with an embodiment of the present invention.

The exemplary methods may be described in the general context of computer executable instructions embodied on a computer-readable medium. Generally, computer executable instructions can include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

The order in which the methods are described is not intended to be construed as a limitation, and any number of the described method blocks can be combined in any order to implement the method, or an alternative method. Additionally, individual blocks may be deleted from the methods without departing from the spirit and scope of the methods, systems and devices described herein. Furthermore, the methods can be implemented in any suitable hardware, software, firmware, or combination thereof.

FIG. 5 illustrates an exemplary method of handling commands and for updating file system blocks, according to implementation of the present invention. In an implementation, the commands are handled by a command driver, such as the command driver 212. Further, the updating of the file system blocks may be achieved by a migration module, such as the migration module 114.

At block 502, a source block device, such as the source block device 108, is associated with a destination block device, such as the destination block device 110. For example, an association module, such as the association module 210, associates and maps the blocks on the source block device 108 to the corresponding blocks on the destination block device 110. In one implementation, the information indicating the mapping between the source block device 108 and the destination block device 110 is stored in other data, such as other data 224. Further, once the mapping of the source block device 108 and the destination block device 110 is implemented, an update bitmap, such as the file system update bitmap 216, may be created.

At block 504, one or more commands for performing read or write operations on the blocks are received. In one implementation, the migration module 114 issues commands to the blocks on the source block device 108. The commands could include commands to read or write to the blocks of the source block device 108. The commands generated by the migration module 114, are received by the command driver 212.

At block 506, it is determined whether the received command is a read request or not. For example, the command driver 212 receives the command and determines whether the command received from the migration module 114 is a read request or not. In case the command driver 212 determines that the received command is not a read request ("NO" path from block 506), i.e., it is a write request, for example, intended to relocate a block on the source block device 108, the command is directed to the corresponding block on destination block device 110 (block 508).

Further, the block on the destination block device 108 may be updated in response to the write request. In one implementation, the updating may be achieved by copying the block from the source block device 108 and relocating the block in the destination block device 110, for example, to defragment the data in the block. In one implementation, the migration module 114 identifies the block on the destination block device 110 based on the association of the source block device 108 and the destination block device 110. In one implementation, the migration module 114 generates a block group update bitmap, such as block group update bitmap 302, corresponding to the block group in which a block is updated.

In case the command is a read request ("YES" path from block 506), it is further determined (block 510) whether the read request is directed to a block on the source block device 108, which block has already been updated, for example, relocated, on the destination block device 110. In one implementation, the migration module 114 determines whether the block at the source block device 108 has been updated, based on the file system update bitmap 216.

If the read request is for a block which has been updated "YES" path from block 510), the request is directed to the corresponding block on the destination block device 110 (block 512). In one implementation, the command driver 212 directs the read request to the destination block device 110.

Conversely, if at block 510 it is determined that the read request is directed to a block on the source block device 108, which has not been updated on the destination block device 110 ("NO" path from block 510), then the read request is directed towards the block on the source block device 108. In one implementation, the command driver 212 directs the read request to the source block device 108.

FIG. 6 illustrates a method for performing migration of blocks, according to an implementation of the present invention. These blocks may include, for example, blocks on the source block device 108, which have data and are not updated. In one implementation, the migration may be performed by the migration module 114.

At block 602, the update status of a block group on the destination block device 110 is determined based on the file system update bitmap 216. In an implementation, the migration module 114 determines the update status of the block group based on an update status field, such as the update status field 306, from the file system update bitmap 216. As mentioned earlier, the file system update bitmap 216 is modified when a block of the block group is updated at the destination block device 110, for example, in response to the write command issued by the migration module 114.

In another implementation, the update status of a block on the destination block device 110 is determined at block 602. In said implementation, the update status is determined based on the file system update bitmap 216.

At block 604, it is determined whether the update status field 306 of the block group is set or not. If, at block 604, the update status field 306 for the block group is set, i.e., is "1" ("YES" path from block 604), it indicates that there was at least one block in the block group on the destination block device 110 that was updated, for example, copied from the source block device 108 and defragmented at the destination block device 110.

In another implementation, the update status of the block is checked to be set or clear. In said implementation, if the status is set, i.e., it indicates that the block is updated, then the method from block 602 is again executed for the next block in sequence. Further, if the status for the block is clear, i.e. it indicates that the block is not updated, then a copy bitmap is computed for each block (block 606).

At block 606, a copy bitmap, such as the copy bitmap 218, is computed. In an implementation, the copy bitmap 218, for example, the block group copy bitmap, is generated for the block group under consideration. In one implementation, the copy bitmap 218 is computed based on the file system update bitmap 216 and the destination allocation bitmap 222. In one implementation, the copy bitmap 218 is generated by determining a XOR of the block group update bitmap 302 in the file system update bitmap 216 and the destination block group bitmap 402 in the destination allocation bitmap 222. The copy bitmap 218 may indicate the blocks to be copied from the source block device 108. In an implementation, set bits in the block group copy bitmap illustrate those blocks in the source block device 108 that have not been updated at the destination block device 110 but have data.

In another implementation, the copy bitmap 218 is generated individually for the blocks for which the update status is clear in the file system update bitmap 216. In said implementation, the copy bitmap 218 is computed based on the file system update bitmap 216 and the destination allocation bitmap 222. For example, in such a case, the copy bitmap 218 is generated by computing a XOR of the bits in the file system update bitmap 216 and the bits in the destination allocation bitmap 222 corresponding to those blocks for which the update status is clear in the file system update bitmap 216.

At block 608, the blocks from the source block device 108 are copied to the destination block device 110 based on the copy bitmap 218. In an implementation, the blocks corresponding to the set bits in the copy bitmap 218 are copied from the source block device 108 to the destination block device 110.

Returning to the decision block 604, if the update status field 306 is not set, i.e., the update status field 306 in the file system update bitmap 216 is "0" ("NO" path from block 604) then blocks from the block group of the source block device 108, which have data, are copied to the corresponding blocks in the destination block device 110 at block 610. In one implementation, the copying of the blocks is based on a source allocation bitmap, such as the source allocation bitmap 220. For example, the blocks are copied from the source block device 108 based on a source block group bitmap, such as the source block group bitmap 402, in the source allocation bitmap 220. In an implementation, the source allocation bitmap 220 indicates those blocks, which have data on the source block device 108. For example, set bits in the source allocation bitmap 220 may indicate the blocks that have data on the source block device 108 and at block 610 such blocks are copied from the source block device 108.

The methods and devices described herein perform file system migration with dynamic relocation of the file system blocks on the destination block device without affecting the file system on the source block device. According to an aspect, the relocation of the file system blocks on the destination block device may downsize the file system. With such a file system migration, the file system may be migrated to a destination block device which is smaller than the source block device without any loss of data. Further, the described methods and devices may be employed to migrate fragmented file systems to achieve effective storage consolidation, efficient disk space utilization/optimization at the destination block device.

CONCLUSION

Although implementations for performing file system migration have been described in language specific to structural features and/or methods, it is to be understood that the invention (and not appended claims) is not necessarily limited to the specific features or methods described. Rather, the specific features and methods for performing file system migration are disclosed as exemplary implementations of the present invention.

I claim:
1. A method to perform file system migration, the method comprising:
associating a source block device to a destination block device, wherein the source block device and the destination block device include a plurality of source blocks and destination blocks, respectively;
directing at least one directed command for a source block from the plurality of source blocks to the source block device or the destination block device based at least on the associating and a file system update bitmap on the source block device;
computing a copy bitmap based on the file system update bitmap, wherein the copy bitmap indicates at least one block on the source block device has been allocated but has not been updated at the destination block device;
updating a destination block from the plurality of destination blocks based, in part, on the at least one directed command and the copy bitmap;
tracking an updated status associated with the destination block via the file system update bitmap on the source block device; and
copying a source block from the plurality of source blocks, associated with a destination block that has not been updated, to the destination block device.

2. The method as claimed in claim 1, wherein the at least one directed command is generated during the file system migration.

3. The method as claimed in claim 1, wherein the directing the at least one directed command further comprises subsequently directing the at least one directed command to the destination block associated with the source block when the at least one directed command is a write request.

4. The method as claimed in claim 1, wherein the directing further comprises:
for the at least one directed command being a read request, subsequently directing the at least one directed command to the source block, if a corresponding destination block has not been updated; and
for the at least one directed command being the read request, subsequently directing the at least one directed command to another destination block from the plurality of destination blocks corresponding to the source block, when the another destination block has been updated.

5. A system for file system migration comprising:
a computing device including:
a processor;
a memory coupled to the processor, to
associate a source block device to a destination block device, wherein the source block device and the destination block device include a plurality of source blocks and destination blocks, respectively;
direct at least one directed command for a source block from the plurality of source blocks to the source block device or the destination block device based at least on the associating and a file system update bitmap on the source block device;
compute a copy bitmap based on the file system update bitmap, wherein the copy bitmap indicates at least one block on the source block device has been allocated but has not been updated at the destination block device;
update a destination block from the plurality of destination blocks based, in part, on the at least one directed command and the copy bitmap;
track the updated status associated with the destination block via the file system update bitmap on the source block device; and
copy a source block from the plurality of source blocks, associated with a destination block that has not been updated, to the destination block device.

6. The system as claimed in claim 5, further comprising modifying the file system update bitmap to track updates to at least one block on the destination block device.

7. The system as claimed in claim 5, further comprising modifying of the file system update bitmap when at least one block on the destination block device is updated.

8. The system as claimed in claim 5, wherein computing the copy bitmap is also based on a destination allocation bitmap to indicate the at least one block on the source block device that has been allocated based on the destination allocation bitmap but has not been updated at the destination block device.

9. The system as claimed in claim 8, wherein migrating a file system from the source block device to the destination block device is based on the copy bitmap.

10. A non-transitory computer-readable medium having a set of computer readable instructions that, when executed, perform acts comprising:
in response to at least one command for relocation of at least one block on a source block device, relocating the at least one block from the source block device to a destination block device based on an association between the source block device and the destination block device;
updating a file system update bitmap on the source block device in response to the relocating;
computing a copy bitmap based on the file system update bitmap, wherein the copy bitmap indicates at least one block on the source block device has been allocated but has not been updated at the destination block device;
copying at least one other block from the source block device to the destination block device based on the copy bitmap, wherein the at least one other block has not been relocated; and
tracking an updated destination block via the file system update bitmap on the source block device.

11. The non-transitory computer-readable medium as claimed in claim 10, wherein the copying further includes computing a copy bitmap based on the file system update bitmap and a destination allocation bitmap.

12. The non-transitory computer readable medium as claimed in claim 10, wherein the copying is based on a source allocation bitmap when none of the blocks of the source block device are updated.

13. The non-transitory computer readable medium as claimed in claim 10, wherein the relocating comprises mapping the at least one block of the source block device to at least one block on the destination block device.

14. The non-transitory computer readable medium as claimed in claim 13, wherein the relocating further comprises directing commands to the source block device for reading at least one block from the source block device based on the mapping, when the at least one block has not been updated at the destination block device.

* * * * *

UNITED STATES PATENT AND TRADEMARK OFFICE
CERTIFICATE OF CORRECTION

Page 1 of 1

PATENT NO. : 9,037,538 B2
APPLICATION NO. : 13/642062
DATED : May 19, 2015
INVENTOR(S) : Kishore Kaniyar Sampathkumar It is certified that error appears in the above-identified patent and that said Letters Patent is hereby corrected as shown below:

In the claims

In column 16, line 35, in Claim 12, delete "computer readable" and insert -- computer-readable --, therefor.

In column 16, line 39, in Claim 13, delete "computer readable" and insert -- computer-readable --, therefor.

In column 16, line 43, in Claim 14, delete "computer readable" and insert -- computer-readable --, therefor.

Signed and Sealed this
Twenty-seventh Day of October, 2015

Michelle K. Lee
*Director of the United States Patent and Trademark Office*